US008081424B2

(12) United States Patent
Haspil et al.

(10) Patent No.: US 8,081,424 B2
(45) Date of Patent: Dec. 20, 2011

(54) METHOD FOR POSITIONING A USER INTERFACE OF A COMPUTING DEVICE

(75) Inventors: John Haspil, Boerne, TX (US); David Mornhineway, San Antonio, TX (US); Larry B. Pearson, San Antonio, TX (US); Tyler Wallis, San Antonio, TX (US); Jerry O'Leary, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1211 days.

(21) Appl. No.: 11/680,523

(22) Filed: Feb. 28, 2007

(65) Prior Publication Data

US 2008/0204978 A1  Aug. 28, 2008

(51) Int. Cl.
  *H05K 5/00*  (2006.01)
(52) U.S. Cl. ............ 361/679.01; 455/575.1; 379/428.02
(58) Field of Classification Search ............. 361/679.01; 379/428.02; 455/573, 575.1
  See application file for complete search history.

(56) References Cited

U.S. PATENT DOCUMENTS

| 5,485,370 | A  | * | 1/1996 | Moss et al. .................... 709/217 |
| 7,082,028 | B2 | * | 7/2006 | Huilgol et al. ............ 361/679.07 |
| 2004/0016796 | A1 | * | 1/2004 | Hanna et al. .................. 235/375 |

* cited by examiner

*Primary Examiner* — Lisa Lea-Edmonds
(74) *Attorney, Agent, or Firm* — Guntin Meles & Gust, PLC; Andrew Gust

(57) ABSTRACT

A method for positioning a user interface of a computing device is disclosed. A system that incorporates teachings of the present disclosure may include, for example, a computing device having a user interface (UI), a counterweight, and a housing assembly that houses the UI with one or more exposed portions, and the counterweight. The counterweight can be positioned in the housing assembly to cause a desired position of at least one of the one or more exposed portions of the UI when a select one of a plurality of surfaces of the housing assembly rests on a nearly planar surface. Additional embodiments are disclosed.

24 Claims, 4 Drawing Sheets

300

400

METHOD FOR POSITIONING A USER INTERFACE OF A COMPUTING DEVICE

FIELD OF THE DISCLOSURE

The present disclosure relates generally to communication devices, and more specifically to a method for positioning a user interface of a computing device.

BACKGROUND

Computing devices such as cordless phones, personal digital assistants, digital organizers, MP3 and/or MPEG 4 players, and cell phones generally include a user interface (UI) such as a display, keypad, and audio system with private audio and in some instances high audio features. When using a high audio feature such as a speakerphone there can be circumstances when an end user of the computing device desires to place said device on a table or other surface to engage in other tasks.

Depending on the device's position on the table, the amplitude of audio waves generated by the speakerphone may be diluted by reflections and other distortions which can reduce the volume of sound heard by the end user. Additionally, the display of the computing device can be in an awkward perspective which can impede viewing images that may be of interest to the end user such as, for example, when said user is engaged in a video conference call, or viewing movies or screen play of still images.

A need therefore arises for method for positioning a UI of a computing device.

DETAILED DESCRIPTION

Embodiments in accordance with the present disclosure provide a method for positioning a user interface of a communication device.

In a first embodiment of the present disclosure, a communication device can have a user interface (UI), a counterweight, and a housing assembly that houses the UI with one or more exposed portions, and the counterweight. The counterweight can be positioned in the housing assembly to cause a desired position of at least one of the one or more exposed portions of the UI when a select one of a plurality of surfaces of the housing assembly rests on a nearly planar surface.

In a second embodiment of the present disclosure, a computing device can have a housing assembly that houses a UI with one or more exposed portions and a counterweight that causes a desired position of each of the one or more exposed portions of the UI when a select one of a plurality of surfaces of the housing assembly rests on a nearly planar surface.

In a third embodiment of the present disclosure, a method can involve positioning a counterweight in a housing assembly that houses a UI with one or more exposed portions to cause a desired position of each of the one or more exposed portions of the UI when a select one of a plurality of surfaces of the housing assembly rests on a nearly planar surface.

Figure 1:
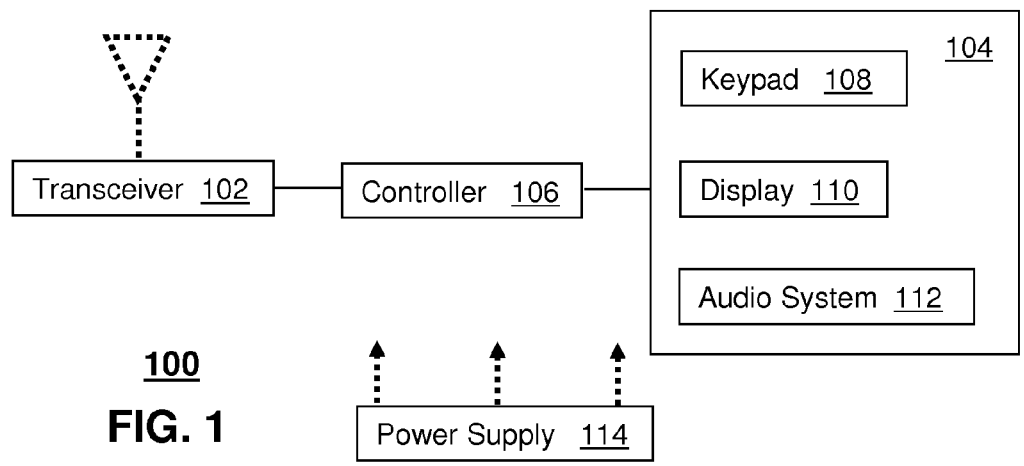
FIG. 1 depicts an exemplary block diagram of a communication device.

FIG. 1 depicts an exemplary embodiment of a communication device 100. The communication device 104 can comprise a wireline or wireless transceiver 102 (herein transceiver 102), a user interface (UI) 104, a power supply 114, and a controller 106 for managing operations thereof. The transceiver 102 can utilize common wireless access technologies such as cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise. Alternatively, the transceiver 102 can support short-range wireless access technologies such as Bluetooth, WiFi, or cordless technologies such as Digital Enhanced Cordless Telecommunications (DECT) or Personal Handyphone System (PHS). Alternatively, or in combination the transceiver 102 can support wireline technologies such as a plain old telephone service (POTS), or xDSL interface.

The UI 104 can include a depressible or touch-sensitive keypad 108 with roller ball or navigation disk for manipulating operations of the communication device 100. The UI 104 can further a display 110 such as monochrome or color LCD (Liquid Crystal Display) for conveying images to the end user of the communication device 100. The UI 104 can also include an audio system 112 that utilizes common audio technology for conveying private audio (e.g., audio heard only in the proximity of a human ear) and high audio (e.g., speakerphone for hands free operation). The audio system 112 can further include a microphone for intercepting audible signals of an end user.

The power supply 114 can utilize common power management technologies such as replaceable batteries, supply regulation technologies, and charging system technologies for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other storage technologies.

Figure 2:
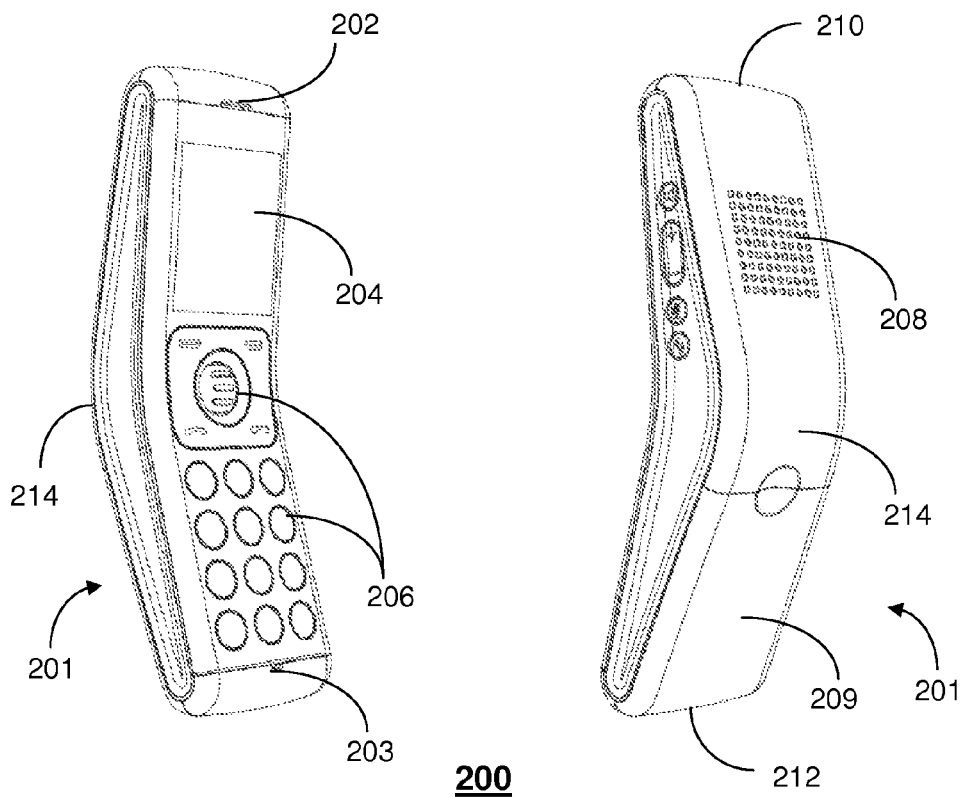
FIGS. 2-3 depict exemplary perspectives of the communication device.
Figure 3:
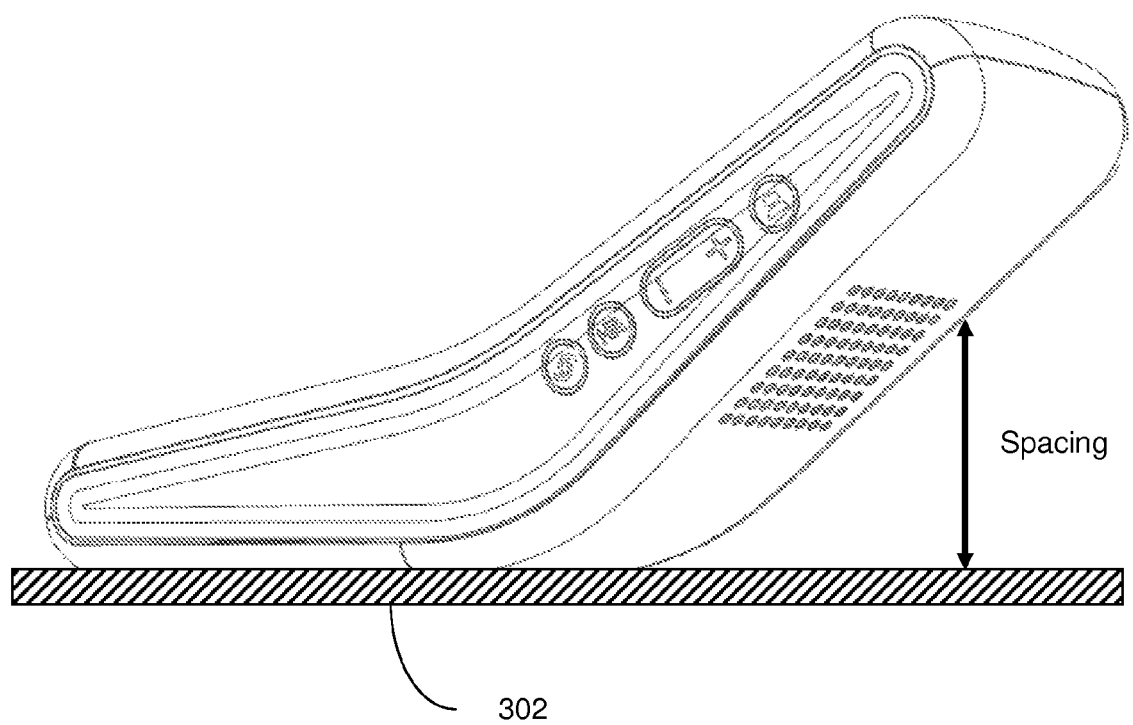

FIGS. 2-3 depict exemplary perspectives 200-300 of the communication device 100. FIG. 2 depicts front and back perspectives of a housing assembly 201 for housing the aforementioned components 102-114 of the communication device 100. On the front-side of the communication device 100 the housing assembly 201 exposes portions of the UI 104. In particular, a slot 202 can be used to convey low audio signals of the audio system 112. Slot 203 exposes a microphone for intercepting audio signals of an end user of the communication device 100. Slot 204 exposes a glass portion of the display 110. Portions of the keypad 108 (buttons, roller ball, and soft keys) are exposed by slots 206. On the back-side of the communication device 100 the housing assembly 201 exposes the high audio portion of the audio system 112 by way of a grid of slots 208. A battery door 209 slideably attached to the housing assembly 201 can hold a rechargeable battery pack of the power supply 114 that can be readily replaced when expired.

The housing assembly 201 has a curvature 214 between opposite ends 210, 212 of said assembly. The curvature 214 of the housing assembly 201 ergonomically complements ear to mouth placement for an end user of the communication device 100. When the communication device 100 is placed in an upright position on a nearly planar surface such as a table, the high-audio grid 208 or the battery door 209 would generally rest on said table depending on which side is heavier. To optimize the performance of the speakerphone feature of the audio system 112, the housing assembly 201 is designed to carry more weight on side 212 opposite grid 208.

To accomplish this, a counterweight technique is applied to the housing assembly 201. The counterweight can be the battery back of the power supply 114 referred to earlier, and/or additional weighted objects which may or may not have an operational function other than to cause the housing assembly 201 to position the gird 208 away from the table. Additionally, the counterweight can be stationary or movable within the housing assembly 201. In the latter case, the counterweight can be movable by end user action or by gravity.

The curvature 214 can be carefully selected so that the spacing between the grid 208 and the table surface provides the best possible audio amplitude performance for the speakerphone feature. The selected curvature 214 can also be influenced by a viewing angle of display 110 in slot 204. That is, said curvature 214 can be chosen so that when the communication device 100 is resting on the table, the viewing angle of the display 110 provides an end user a large range of viewing possibilities for still and/or moving images produced by, for example, a video conference call, or multimedia playback of a video or other multimedia file. FIG. 3 illustrates a perspective view of the communication device 100 with the aforementioned counterweight included in the housing assembly 201 causing said assembly to rest on the battery door 209, thereby creating a spacing between the grid 208 and a table surface 302 effectuated by curvature 214. The curvature 214 as noted earlier also provides an ergonomic viewing angle for the display 110.

Figure 4:
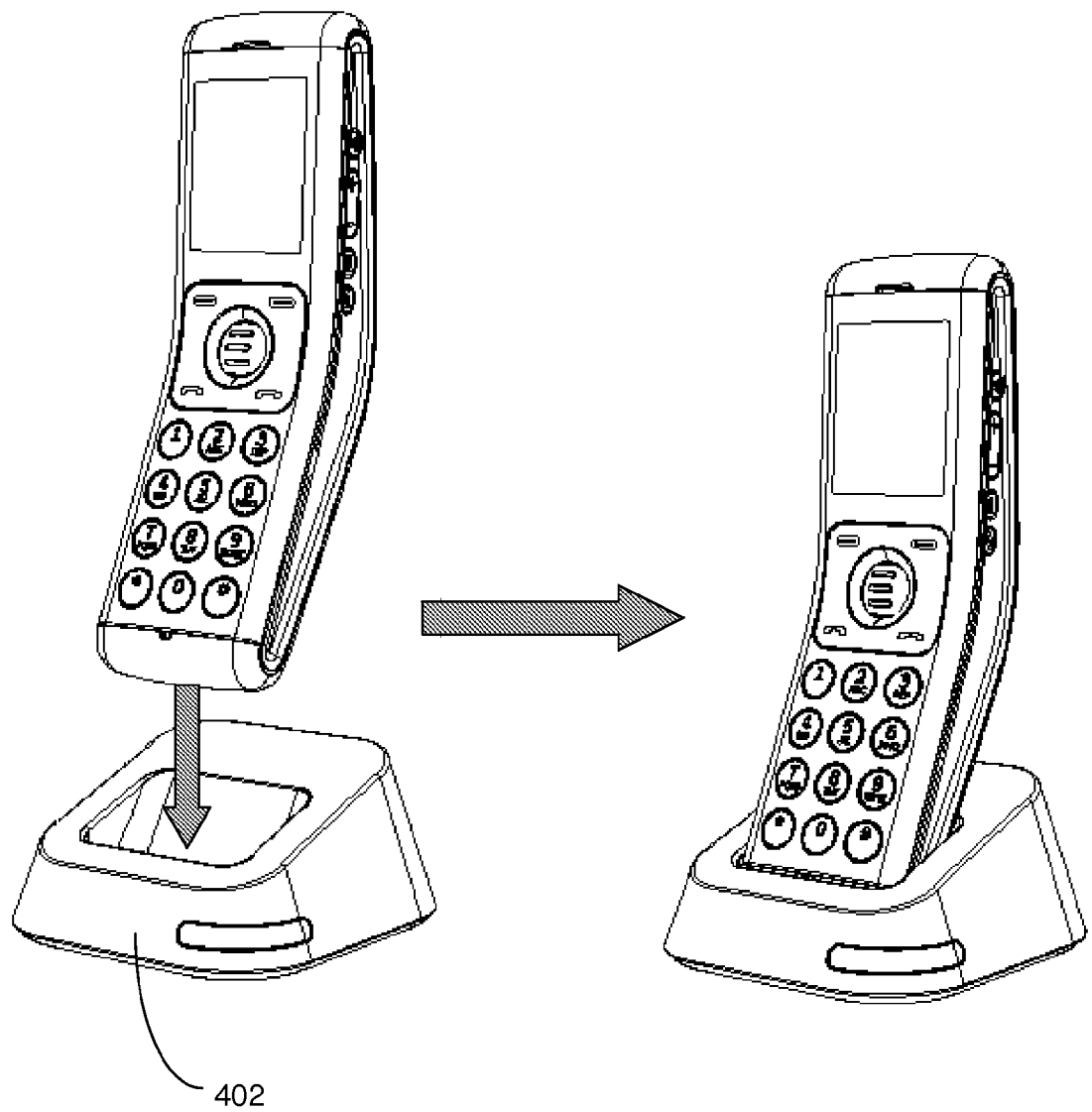
FIG. 4 depicts an exemplary embodiment of the communication device engaged with a charging cradle.

FIG. 4 depicts an exemplary embodiment 400 of the communication device 100 engaged with a charging cradle 402. The power supply 114 can recharge a battery pack by common means using a common electromechanical or inductive coupling method. In the case of an electromechanical coupling, the housing assembly 201 can be designed to expose conductive contacts (e.g., power and ground) that couple to corresponding contacts of the charging cradle 402 for supplying a DC charge by way of a transformer wired to the cradle that converts AC power (e.g., 110 Volts) to DC power (e.g., 5 Volts).

Alternatively, the charging cradle 402 can include common primary coil which supplies a magnetic flux to a common secondary coil which is made part of the power supply 114. With rectification methods the power supply 114 can extract a DC voltage which can be used to charge the battery pack. The number of turns on each coil can affect the DC charge supplied to the power supply 114.

It should be further noted that the engagement portion of the charging cradle 402 is designed with an angled entry for the communication device 100 for ease of viewing the display 110 while it is in the cradle. This ergonomic feature of the charging cradle 402 can be useful to an end user to view caller ID messages presented by the display 110 while the communication device 100 is being charged.

From the foregoing descriptions, it would be evident to an artisan with ordinary skill in the art that the aforementioned embodiments of the communication device 100 can be modified, reduced, or enhanced without departing from the scope and spirit of the claims described below. For example, the housing assembly 201 can have other shapes or form factors that result in a similar effect to positioning the UI 104 by way of one or more counterweights placed in said assembly. Additionally, communication device 100 can be replaced with another form of a computing device (e.g., a personal digital assistant, an organizer, an MP3 or MPEG4 player) that does not necessarily have a transceiver but utilizes a counterweight to help position a UI as described herein. These examples illustrate how the embodiments described herein can be updated without altering the scope of the claims below. Accordingly, the reader is directed to the claims for a fuller understanding of the breadth and scope of the present disclosure.

Figure 5:
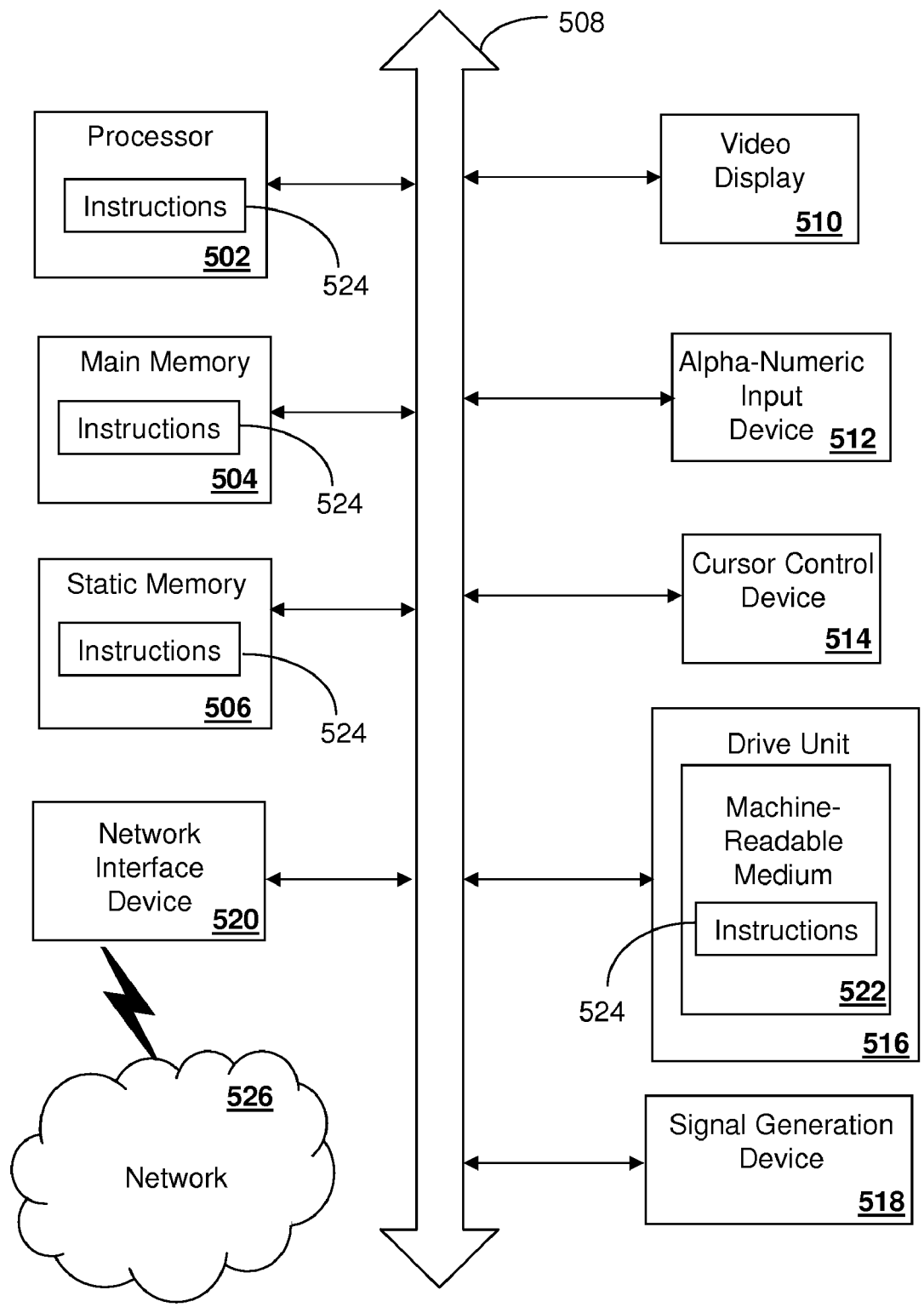
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a user interface (UI);
   a counterweight; and
   a housing assembly that houses the UI with one or more exposed portions, and the counterweight, wherein the counterweight is positioned in the housing assembly to cause a desired position of at least one of the one or more exposed portions of the UI when a select one of a plurality of surfaces of the housing assembly rests on a nearly planar surface, wherein the counterweight comprises one or more weighted objects having no communication function.

2. The communication device of claim 1, wherein the select one of the plurality of surfaces has a curvature between first and second ends of the select surface.

3. The communication device of claim 2, wherein the counterweight is positioned near one among the first and second ends of the select surface.

4. The communication device of claim 1, wherein the one or more exposed portions of the UI comprise at least one among an exposed portion of an input device, an exposed portion of a display, and a plurality of exposed portions of an audio system.

5. The communication device of claim 4, wherein the counterweight causes the exposed portion of the input device to a first desired position, the exposed portion of the display to a second desired position, and the plurality of exposed portions of the audio system to a corresponding plurality of desired positions.

6. The communication device of claim 5, wherein the first desired position comprises the exposed portion of the input device extending in a same direction as the nearly planar surface.

7. The communication device of claim 5, wherein the second desired position comprises the exposed portion of the display being angular to the nearly planar surface.

8. The communication device of claim 5, wherein the plurality of desired positions of the audio system comprises a first one of the plurality of exposed portions having an angular position to and conveying audio waves directed to the nearly planar surface, and a second one of the plurality of exposed portions having an angular position to and conveying audio waves directed away from the nearly planar surface.

9. The communication device of claim 8, wherein the first one of the plurality of exposed portions is coupled to a high audio speaker element of the audio system, and the second one of the plurality of exposed portions is coupled to a low audio speaker element of the audio system.

10. The communication device of claim 9, wherein the angular position of the first one of the plurality of exposed surfaces creates a spacing between the high audio speaker element and the nearly planar surface, and wherein said spacing affects an amplitude of audio waves reflected from the nearly planar surface.

11. The communication device of claim 9, wherein the first one of the plurality of exposed portions comprises a first surface of the housing assembly with a plurality of openings, and the second one of the plurality of exposed portions comprises a second surface of the housing assembly with one or more openings.

12. The communication device of claim 1, wherein said counterweight is stationary or movable within the housing assembly.

13. The communication device of claim 1, comprising:
a power supply;
a transceiver; and
a controller that manages operations of the power supply, the transceiver and the UI, wherein the power supply, the transceiver and the controller element are housed by the housing assembly, wherein the counterweight comprises one or more batteries of the power supply.

14. The communication device of claim 13, wherein the transceiver comprises at least one among a wireless and a wireline transceiver.

15. The communication device of claim 13, wherein the wireless transceiver operates according to at least one among a cordless phone access protocol and a cellular phone access protocol.

16. The communication device of claim 13, comprising a charging cradle that couples to the housing assembly of the communication device.

17. The communication device of claim 16, wherein the charging cradle charges one or more batteries of the power supply by inductive coupling.

18. The communication device of claim 16, wherein the charging cradle charges one or more batteries of the power supply by electromechanical coupling.

19. A computing device, comprising a housing assembly that houses a user interface (UI) with one or more exposed portions and a counterweight that causes a desired position of each of the one or more exposed portions of the UI when a select one of a plurality of surfaces of the housing assembly rests on a nearly planar surface, wherein the counterweight comprises one or more weighted objects having no communication function.

20. The computing device of claim 19, wherein the select one of the plurality of surfaces has a curvature between first and second ends of the select surface.

21. The computing device of claim 20, wherein the counterweight is positioned near one among the first and second ends of the select surface.

22. A method, comprising positioning a counterweight in a housing assembly that houses a user interface (UI) with one or more exposed portions to cause a desired position of each of the one or more exposed portions of the UI when a select one of a plurality of surfaces of the housing assembly rests on a nearly planar surface, wherein the counterweight comprises one or more weighted objects having no communication function.

23. The method of claim 22, wherein the select one of the plurality of surfaces has a curvature between first and second ends of the select surface, and wherein the counterweight is positioned near one among the first and second ends of the select surface.

24. The method of claim 22, wherein the one or more exposed portions of the UI comprise at least one among an exposed portion of an input device, an exposed portion of a display, and a plurality of exposed portions of an audio system.

* * * * *